United States Patent Office 3,721,581
Patented Mar. 20, 1973

3,721,581
PROCESS FOR FLAMEPROOFING TREATMENT
Kazuhiro Teramura and Terukazu Ishizuka, Kyoto-shi,
Japan, assignors to Mitsubishi Chemical Industries Limited, Tokyo, Japan
No Drawing. Filed Jan. 6, 1971, Ser. No. 104,463
Int. Cl. C09d 5/18; C09k 3/28
U.S. Cl. 117—137                           3 Claims

ABSTRACT OF THE DISCLOSURE

A process for flameproof treatment of fibers, films, sheets, boards and other articles by use of a compound having the general formula:

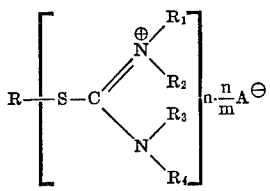

wherein R represents a non-substituted or substituted hydrocarbon group or a heterocyclic group; and $R_1$, $R_2$, $R_3$, and $R_4$, respectively, represent hydrogen atoms or non-substituted or substituted hydrocarbons or a component of a heterocyclic group formed from two components selected from $R_1$, $R_2$, $R_3$, and $R_4$ and A represents an inorganic or an organic anion, and $n$ represents an integer of 1–6 and $m$ represents the valency of A.

BACKGROUND OF THE INVENTION

Field of the invention

The present invention relates to a process for flameproofing fibers, films, sheets, boards, and other articles, and especially a process for providing permanent flameproofing properties to fibers, films, sheets, boards, and other articles.

Description of the prior art

It has been known that various inorganic salts, such as sodium phosphate and sodium molybdate; various metallic oxides, such as antimonyl trioxide; and various organic compounds, such as chlorinated paraffin and urea organo phosphorous compounds, have been used as flameproofing agents or as flame retardants for fibers. The results of these conventional flameproofing agents and retardants are not perfect, especially for synthetic fibers and articles made of polyamide, polyester and polyacrylonitrile.

SUMMARY OF THE INVENTION

It is an object of the present invention to provide flameproofing agents and retardants for fibers, films, sheets, boards, and other articles, and especially for synthetic fibers for various mixed spun synthetic fibers with cellulose fibers and for various mixed woven or non-woven fabrics.

It is another object of the present invention to provide new types of flameproofing agents and flame retardants which are useful for moquettes.

It is a further object of the present invention to provide a process for flame-proofing fibers, films, sheets, boards, and other articles.

These and other objects have now herein been provided by treating fibres, films, sheets, boards, and other articles with compounds having the general formula:

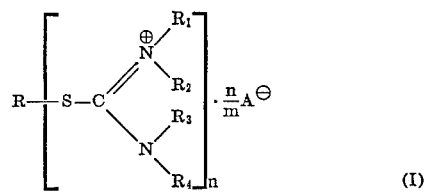

wherein R represents a non-substituted or substituted hydrocarbon group or a heterocyclic group; and $R_1$, $R_2$, $R_3$, and $R_4$, respectively, represent hydrogen atoms or non-substituted or substituted hydrocarbons or a component of a heterocyclic group formed from two components selected from $R_1$, $R_2$, $R_3$, and $R_4$; and A represents an inorganic or an organic anion; and $n$ represents an integer of 1–6 and $m$ represents the valency of A.

DETAILED DESCRIPTION OF THE PREFERRED EMBODIMENT

Typical examples of R in the general Formula I include saturated and unsaturated alkyl radicals, such as methyl, ethyl, propyl, butyl, cyclohexyl, vinyl and alkyl radicals, alkylene radicals, such as methylene, ethylene, and propylene radicals; aralkyl radicals, such as benzyl, aryl radicals, such as phenyl, tolyl and xylyl radicals; and heterocyclic radicals, such as pyridinyl, pyrimidinyl, triazinyl, thiazolyl, imidazolyl, oxazolyl, isoxazolyl, pyrazolyl, quinonyl and acrydyl. Said alkyl, alkylene, aralkyl, aryl and heterocyclic radicals may be substituted by halogen atom, hydroxy, alkoxy, phenyl, epoxy, acyl, acylamine, acyloxy, amino, imino, carbonyl, carboxyl, carboxylic ester, and phosphor containing, such as phosphoric ester, and phosphorous acid ester. Moreover, R can be a polymeric hydrocarbon group which may be substituted by hydroxy, cyano, carboxyl, carboxylic ester, carbamoyl radical, and halogen atom, such as polyvinylalcohol, polyacrylonitrile, polyacrylic acid, esters of polyacrylic acid, polyacrylamide, polystyrene and polyvinylchloride. Typical examples of $R_1$, $R_2$, $R_3$, and $R_4$ in said general Formula I include hydrogen atoms, saturated and unsaturated alkyl, alkylene, aralkyl, aryl and heterocyclic radicals, as mentioned above for R.

In the present invention, it is especially preferable to employ compounds having the general formula:

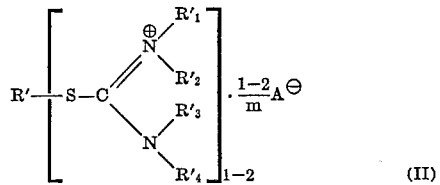

wherein R' represents an alkyl group or an alkylene group having 1–5 carbon atoms, which may be substituted by halogen atom, hydroxy, alkoxy, phenyl, epoxy, amino, imino, acyl, acylamino, acyloxy, carboxy, and phosphorous containing radicals, said alkyl group or alkylene group may also be combined with each other through one or more bivalent radicals such as —O—, —NH—, —CO—, —COO—, or a heterocyclic ring such as triazinyl radical; $R'_1$, $R'_2$, $R'_3$, and $R'_4$, respectively, represent a hydrogen atom, an alkyl group or alkylene group having 1–5 carbon atoms as mentioned above for R' or two of said $R'_1$, $R'_2$, $R'_3$, and $R'_4$ may be combined with each other to form a heterocyclic ring such as:

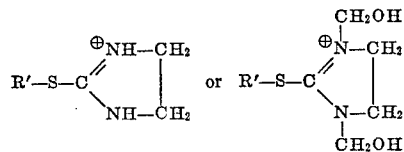

A represents an inorganic anion such as a halogen atom, e.g., Cl, Br, I, an anion of an inorganic acid such as sulfuric acid, phosphoric acid, phosphorous acid and rhodanic acid; and an organic anion of an organic acid, such as acetic acid, propionic acid, alkyl sulfonic acid, dithiocarbamic acid, alkyl phosphonous acid, alkyl phosphonous acid monoester, dialkylphosphinic acid, dialkylphosphonous acid, alkylphosphoric acid and dialkylphosphoric acid; $m$ represents the valency of A.

Incidentally, the general Formula I corresponds to:

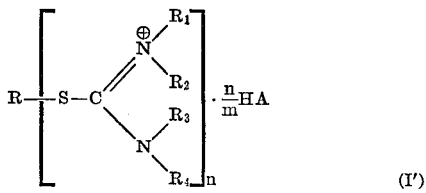

(I')

The compounds having said general Formula I or I' can be produced by various methods. Typical processes for producing said compound is to react a compound having the general formula

(wherein R is the same as that of the general Formula I; X represents a halogen atom and 1 represents an integer of from 1–6) with thiourea or N-derivatives thereof having said general formula:

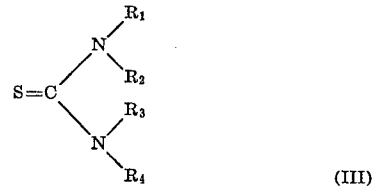

(III)

(wherein $R_1$, $R_2$, $R_3$, and $R_4$ are, respectively, the same as those of the general Formula I) in a suitable organic solvent, such as alcohol, at room temperature or higher.

Typical examples of compounds having general formula $R—X_1$ are illustrated as follows:

CH₃Pr
C₂H₅Br
C₃H₇Br
C₄H₉Br
CH₃CH₂CHBrCH₃
ICH₂I
ICH₂CH₂I
ICH₂CH₂Br
ClCH₂CH₂CH₂Br
CH₂BrCHBrCH₂Br
CH₂BrCHBrCH₂CH₃
CH₃CHI₂
CH₃CBr₂CH₃
Br₂CHCHBr₂
ClCH₂Br
CH₂=CH—CH₂I
CH₃CHBrCH=CH₂

CH₂=CBr₂

CH₃I
C₂H₅I
(CH₃)₂CHBr
C₄H₉I
BrCH₂Br
BrCH₂CH₂Br
ClCH₂CH₂Br
BrCH₂CH₂CH₂Br
CH₃CHBrCH₂Br
CH₃CHBrCHBrCH₃
CH₃CHBr₂
BrCCl₂CH₂Br
CH₃CBr₂CH₂CH₃
C(CH₂Br)₄
CH₂=CH—CH₂Br
CH₃—CH=CH—CH₂Br
Br—CH=CH—Br

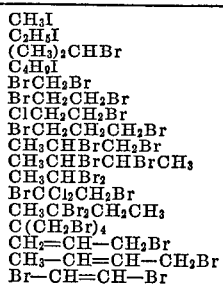

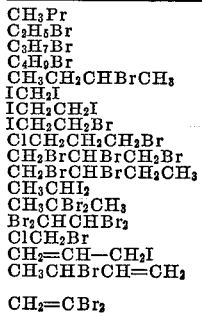

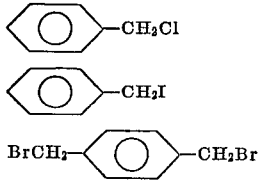

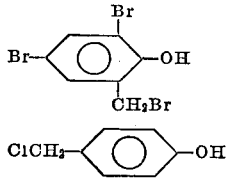

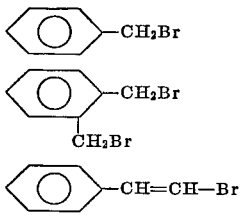

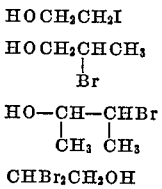

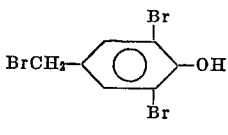

HOCH₂—CH₂—Br
HOCHCH₂Br
     |
     CH₃
HO(CH₂)₆Br

HO—CH—CHI
    |    |
    CH₃ CH₃

CBr₃CH₂OH

CH₂—CH—CH₂
 |    |    |
 Br   Br  OH

CH₂—CH—CH₂
 |    |    |
 Br   OH   Cl

CH₂—CH—CH₂
 |    |    |
 I    OH   OH

CH₂—CH—CH—CH₂
 |    |    |    |
 OH  OH   Br   Br

BrCH₂—C(CH₂OH)₃

HOCH₂CH₂I
HOCH₂CHCH₃
         |
         Br

HO—CH—CHBr
    |    |
    CH₃ CH₃

CHBr₂CH₂OH

CH₂BrCHBrOH

CH₂—CH—CH₂
 |    |    |
 Br   OH   Br

CH₂—CH—CH₂
 |    |    |
 Br   OH   OH

CH₂—CH—CH—CH₂
 |    |    |    |
 OH   Br   Br   OH

CH₂—CH—CH—CH₂
 |    |    |    |
 Br   OH   OH   Br (BrCH₂)₂C(CH₂OH)₂

| | |
|---|---|
| (BrCH₂)₃C—CH₂OH | C₃H₇OCH₂Cl |
| C₂H₅OCH₂Cl | C₂H₅OCH=CHBr |
| BrCH₂CH₂OCH₂CH₂Br | (CH₂BrCHBrCH₂)₂O |
| CH₃OCH₂CHOHCH₂Br | (CH₃CHBrCH₂)₂O |
| CH₂BrCHBrCH₂OCH₂—CH=CH₂ | |
| BrCH₂—CH——CH₂<br>　　　　＼O／ | ICH₂—CH——CH₂<br>　　　　＼O／ |
| Br(CH₂)₄COCH₃ | BrCH₂COCH₂Br |
| CH₃COCH₂Cl | ClCH₂CHO |
| BrCH₂CHO | ICH₂CHO |
| CH₃CHBrCHO | BrCH₂CH(OC₂H₅)₂ |
| CH₃COCH₂Br | |
| ⬡—COCH₂Br | ⬡—COCH₂Cl |
| | Cl—⬡—COCH₂Br |
| ICH₂CH₂NH₂ | CH₃CHBrCH₂NH₂ |
| CH₂BrCHBrCH₂NH₂ | CH₃CHBrCH₂NH₂ |
| ClCH₂COOCH₃ | ClCH₂COOH |
| ClCH₂CONHCH₂OH | ClCH₂CONH₂ |
| ICH₂COOH | BrCH₂COOH |
| BrCH₂CH₂COOC₂H₅ | BrCH₂CH₂COOH |
| | Br(CH₂)₅COOH |
| CH₃CHCOOCH<br>　｜<br>　Cl | CH₂CHCOOH<br>　｜<br>　Br |
| CH₃CH₂CHCOOH<br>　　　｜<br>　　　Br | CH₂BrCHBrCOOH |
| I₂CH₂CH₂COOH | CH₂=C—COOH<br>　　　｜<br>　　　Cl |
| CH₂=C—COOH<br>　　｜<br>　　Br | CH=CH—COOH<br>　　　｜<br>　　　Br |
| ⬡—CH——CH—COOC₂H₅<br>　　｜　｜<br>　　Br　Br | |
| CH₃OOC—CH—COOCH₃<br>　　　　｜<br>　　　　Cl | C₂H₅OOC—CH—COOC₂H₅<br>　　　　　｜<br>　　　　　Br |
| C₂H₅OOC—CH—COOC₂H₅<br>　　　　｜<br>　　　　I | C₂H₅OOC—C—COOC₂H₅<br>　　　　　｜　Cl<br>　　　　　Cl |
| C₂H₅OOC—CH₂—CH—COOC₂H₅<br>　　　　　　　｜<br>　　　　　　　Cl | CH₃OOC—CH₂—CH—COOC₂H₅<br>　　　　　　　｜<br>　　　　　　　Br |
| C₂H₅OOC—CH—CH—COOC₂H₅<br>　　　　｜　｜<br>　　　　Cl　Cl | C₂H₅OOC—CH—CH—COOC₂H₅<br>　　　　｜　｜<br>　　　　Br　Br |
| CH₃OOC—CHCH₂CH₂—COOCH₃<br>　　　　｜<br>　　　　Br | CH₃OOC—CH—CH—CH₂—COOCH₃<br>　　　　｜　｜<br>　　　　Br　Br |
| C₂H₅OOC—CHCH₂CH—COOC₂H₅<br>　　　　｜　　　｜<br>　　　　Br　　Br | C₂H₅OOC—CH₂—C—CH₂—COOC₂H₅<br>　　　　　　　｜<br>　　　　　　COOC₂H₅<br>　　　　　　Br |
| C₂H₅OOC—CH₂—C—CHBrCOOC₂H₅<br>　　　　　　｜<br>　　　　　COOC₂H₅<br>　　　　　Br | ClCH₂SO₃H |
| BrCH₂SO₃H | ICH₂SO₃H |
| BrCH₂CH₂SO₃H | BrCH₂CH₂OSO₃H |
| CH₃COOCH₂CH₂Br | CH₃COOCH₂CH₂I |
| CH₃COOCH₂CHCH₂Br<br>　　　　　｜<br>　　　　　Br | CH₃COOCH₂CHCH₃<br>　　　　　｜<br>　　　　　Br |
| CH₃CONHOCH₂CHCH₃<br>　　　　　　｜<br>　　　　　　Br | CH₃CONHCH₂CHCH₂Br<br>　　　　　　｜<br>　　　　　　Br |
| C₂H₅COOCH₂CHOH<br>　　　　　｜<br>　　　　　CH₂Br | C₂H₅COOCH₂—C(CH₂Br)₃ |
| ClCH₂COOCH₂CH₂Br | BrCH₂CONHCH₂CHCH₃<br>　　　　　　｜<br>　　　　　　Br |
| CH₂=CH—CONHCH₂CH₂Br | CH₂=CH—CONH—CH₂—NHCOOCH₂Cl |
| CH₂=CHCONH—CH₂—N(CH₂CHBrCH₃)₂ | CH₂=CH—COOCH₂CH₂I |
| CH₂=C—COOCH₂CHCH₂Br<br>　　｜　　　　　｜<br>　　CH₃　　　　OH | BrCH₂CH₂COOCH₂CHCH₂Br<br>　　　　　　　　｜<br>　　　　　　　　Br |

TABLE—Continued

BrCH₂CH₂COOCH₂—CH——CH₂  
　　　　　　　　　　＼O／

BrCH₂CH₂OCH₂—CH——CH₂  
　　　　　　　　　＼O／

(BrCH₂CH₂CONH)₂CH₂

ClCH₂CONH—CH₂—NHCH₂CH₂I

C₂H₅CONH—CH—CHBrCH₃  
　　　　　　｜  
　　　　　　OH

C₂H₅OCH₂OCH₂CH₂Br 2-chloropyrrole,
2-bromopyrrole,
2,5-dichloropyrrole,
2,3,4,5-tetraiodopyrrole,
2-bromo-3,5-dimethylpyrrole-4-ethylcarbonate,
3-bromo-2,4-dimethylpyrrole-5-carboxylic acid,
3-bromoindole,
3-iodoindole,
3-iodo-2-methylindole,
2-chlorobenzoxazole,
4-bromo-3-methylisooxazole,
4-bromo-3,5-dimethylisooxazole,
2-bromothiazole,
5-bromothiazole,
2-chlorothiazole,
2,5-dibromothiazole,
2-chloro-4-methylthiazole,
2-bromo-5-methylthiazole,
2-bromo-4,5-dimethylthiazole,
5-bromo-2-aminothiazole,
5-chloro-2-aminothiazole,
4-chloro-2-aminothiazole,
5-bromo-2-acetoamidothiazole,
4-chloromethylthiazole,
4-chloromethyl-2-methylthiazole,
5-bromoethyl-4-methylthiazole,
5-chloroacetylthiazole,
2,5-dibromo-4-thiazole sulfonic acid,
5-bromomethyl-2-imino-thiazoline,
5-iodomethyl-2-imino-thiazoline,
5-bromomethyl-2-methylimino-thiazolizine,
5-iodomethyl-2-butylimino-thiazolizine,
5-bromo-5-phenyl-2-thiazoloneimide,
5,5-dibromo-2-imino-4-thiazolidone,
2-chlorobenzothiazole,
2-bromoimidazole,
2-bromo-4(5)-methylimidazole,
2-bromo-4(5)-phenylimidazole,
2,4(2,5)-dibromoimidazole,
2,4-(2,5)-dibromo-5(4)-methylimidazole,
2,4(2,5)-dibromo-5(4)-phenylimidazole,
2,4-dibromo-1,5-dimethylimidazole,
2,4,5-tribromoimidazole,
2,4,5-tribromo-1-methylimidazole,
2-bromo-4(5)-methyl-5(4)-imidazole ethylcarbonate,
2-bromo-4(5)-phenyl-5(4)-imidazole ethylcarbonate,
2,4(2,5)-dibromo-5(4)-imidazole carboxylic acid,
4(5)-bromoimidazole,
4-bromo-1-methylimidazole,
4-bromo-2-methylimidazole,
4(5)-bromo-5(4)-methylimidazole,
5-bromo-1,4-dimethylimidazole,
4-bromo-1,5-dimethylimidazole,
4(5)-bromo-5(4)-phenylimidazole,
4(5)-bromo-5(4)-oxymethylimidazole,
4-bromoimidazole-5-sulfonic acid,
4(5)-bromo-1,3-dimethylimidazolium iodide,
4,5-dibromoimidazole,
4,5-dibromo-1-methylimidazole,
4,5-dibromo-2-methylimidazole,
4,5-dibromo-2-phenylimidazole,
4,5-dibromo-1-ethyl-2-methylimidazole,
5-chloro-1-methylimidazole,
5-chloro-1-ethyl-2-methylimidazole,
5-chloro-1-ethyl-2-phenylimidazole,
5-chloro-1,2-diphenylimidazole,
4,5,4',5'-tetrachloro-2,2'-bisimidazole,
2-iodoimidazole,
2,4(2,5)-diiodoimidazole,
2,4,5-triiodoimidazole,
2,4,5-triiodo-1-ethylimidazole,
1,2,4,5-tetraiodoimidazole,
4,5-diiodo-2-methylimidazole,
1-iodo-2,4,5-trimethylimidazole,
4-bromopyrazole,
4-iodopyrazole,
4-bromo-1-phenylpyrazole,
3-bromoindazole,
3-chloroindazole,
3-iodoindazole,
bis[5-chloro-3-(1,2,4-thiadiazolyl)]-disulfide,
5-chloro-1-methyl-1,2,3-triazole,
5-bromo-4-methyl-1,2,3-triazole,
5-iodo-4-methyl-1,2,3-triazole,
4-chloro-1-methyl-1,2,3-triazole,
4-bromo-1-methyl-1,2,3-triazole,
4-trichloroacetyl-1,2,3-triazole,
4,5-dibromo-1,2,3-triazole,
3-chloro-1,2,4-triazole,
3-bromo-1,2,4-triazole,
3-iodo-1,2,4-triazole,
3-chloro-4-methyl-1,2,4-triazole,
3-chloro-1-phenyl-1,2,4-triazole,
5-chloro-3-methyl-4-phenyl-1,2,4-triazole,
5-bromotetrazole,
2-bromopyridine,
3-bromopyridine,
3-iodopyridine,
dibromopyridine,
tribromopyridine,
tetrabromopyridine,
pentabromopyridine,
2-chloro-3-iodopyridine,
2-bromo-5-pyridinol,
2-bromo-5-ethoxypyridine,
methyl-2-iodo-pyridinium bromide,
2-amino-5-iodopyridine,
2-amino-6-chloropyridine,
2-amino-3,5-dibromopyridine,
4-amino-3-bromopyridine,
4-chloropicoline,
4-bromopiperidine,
3-bromoquinoline,
2-bromoquinoline,
4-bromoquinoline,
3,4-dibromoquinoline,
3-bromomethylquinoline,
4-bromomethylquinoline,
5-bromomethylquinoline,
2-chloro-4-aminoquinoline,
3-bromo-4-quinoline,
3-bromoquinoline-6 carboxylic acid,
3-bromobenzo[f]-quinoline,
bromomethyl 2-quinolylketone,
4-bromoisoquinoline,
3-bromomethylisoquinoline,
9-chloroacridine,
9-bromoacridine,
9-iodoacridine,
4-bromo-6H-1,2-oxazine-6-on,
4,5-dibromo-6H-1,2-oxazine-6-on,
5-bromo-2methylmethathiazine,
3-chloropyridazine,
3,6-dichloropyridazine,
3-chlorocynnoline,
3-bromocynnoline, 4-chlorocynnoline,
3,4-dichlorocynnoline,
3-bromo-4-chlorocynnoline,
2-chloropyrimidine,
4-chloropyrimidine,
2,4-dichloropyrimidine,
2,4,6-trichloropyrimidine,
5-bromopyrimidine,
5-bromo-2-methylpyrimidine,
5-bromo-2-mercaptopyrimidine,
4-bromo-2-aminopyrimidine,
2,4-dichloro-6-propyloxy-triazine,
5-bromo-4-amino-6-oxy-2-mercaptopyrimidine,
4,6-dichloro-2-methoxypyrimidine,
4,6-dichloro-2-aminopyrimidine,
4,6-dichloro-2-methylmercaptopyrimidine,
6-chloro-2-methylmercaptopyrimidine,
2,4,6-tris-bromoethylamino-triazine,
2,4,6-trichlorotriazine,
2-chloro-4,6-bis(bromoethoxy)triazine,
2,4-dichloro-6-bromoethoxyoxytriazine,
2,4,6-tris-bromoethoxytriazine,
2-chloro-4,6-bis(bromopropyloxy)triazine,
5-bromouracil,
5-chloromethyl-1,4-dimethyluracil,
6-chloropurine,
2,6-dichloro-8-oxypurine,
2,6,8-trichloropurine,
2-chloroquinazoline.

Typical examples of compounds having the general formula:

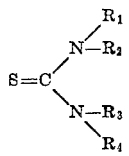

are stated.

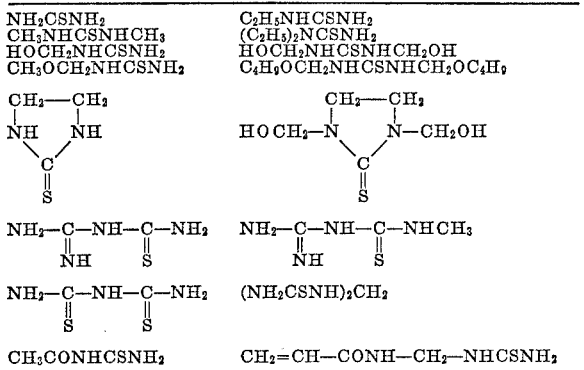

The compounds having at least one group of thiuronium salt in the molecule having the general Formula I can be used for flameproofing fibers, films, sheets, boards and other articles made of natural and artificial materials.

For example, cellulose fibers, such as cotton, viscose rayon, cellulose ester or ether fibers, such as cellulose acetate, natural or synthetic fibers made of wool, silk, polyamide such as nylon, polyester, polyacrylonitrile, polyolefine or copolymers thereof, or blend thereof; and blended fibers and blended woven fabrics can be treated with said compounds to provide permanent flame resistant fibers and textiles. Moreover, films, sheets, boards, and other articles formed from resins of polyvinylchloride, polystyrene, polyolefine, polyamide, polyester, polyacrylonitrile, polyurethane, polycarbonate, phenol resin, urea resin, and melamine resin, can be treated with said compounds to provide permanent flame resistant articles.

It is also possible to blend said compounds with said polymers or monomers prior to molding or spinning. The treatment of said articles with said flameproofing agents, according to the present invention, can be accomplished by dipping, coating, spraying or blending. The flameproofing effect can be increased by heating.

Certain embodiments of the process for the flameproofing treatment of fibers are illustrated as follows:

In a preparation of the flameproofing agent bath, it is convenient to use water, an organic solvent or mixtures thereof as diluent. Since said flameproofing agents are water-soluble, it is preferable to make a bath by dissolving or dispersing said flameproofing agent in an aqueous medium and to continuously or in a batchwise manner dip or apply said bath to a fabric at from room temperature to 100° C. The fabric treated by said step can be dried and heated at about 100°–150° C. It is possible to treat the fabric with various conventional agents for fiber treatment during or following treatment with the flameproofing agents of the present invention to provide more effective flameproofing and to increase durability. Such conventional agents include formaldehyde, methylolurea, methylolthiourea, methylolmelamine, methylolethyleneurea and tetramethylolphosphonium chloride.

The flameproofing agents of the present invention can be used together with conventional flameproofing agents and retardants such as various organic phosphoric acid, organic phosphorous acid, organic phosphonic acid, organic phosphinic acid, organic phosphonous acid, organic phosphine, organic phosphine-oxide; rhodan compounds, e.g., potassium rhodanate, ammonium rhodanate; antimony oxide, titanium tetrachloride, zinc chloride, boric acid and borax.

The flameproofing agents of the present invention are soluble in an aqueous medium and can provide excellent flameproofing properties to all types of fibers by simple operation. Most conventional flameproofing agents can be applied only to a limited variety of fibers.

For example, conventional agents such as tetrahydroxymethyl phosphonium chloride and tris-azilinine phosphine oxide are effective for cellulose fibers; however, they are ineffective for synthetic polymers, such as polyesters and polyamides. On the other hand, thiourea is slightly effective for polyamides but is ineffective for polyesters or cellulose.

It is one of the advantages of the flameproofing agents of the present invention to impart excellent flameproofing properties to various types of materials such as cellulose, cellulose esters, cellulose ethers, polyesters, polyamides and other natural and synthetic polymers.

Having generally described the invention, a further understanding can be obtained by reference to certain specific examples which are provided herein for purposes of illustration only and are not intended to be limiting in any manner.

In the following examples, the flameproofing test was made by the following method corresponding to JISL–1079–1966.

(1) Test piece

A test piece having 50 mm. of width and 250 mm. of length is held at 21±1° C., relative humidity 65±2% for 4 hours and then the test is made.

(2) Test method

The side of the test piece is held in a horizontal direction so that the longitude of the test piece is in the vertical direction.

A Bunsen burner having 9.5 mm. of inner diameter and 34 mm. of flame length is positioned, keeping 19 mm. of distance between the lower edge of the test piece and the upper edge of the Bunsen burner, and the flame is contacted to the test piece for 12 sec.

After contacting the flame, the Bunsen burner is removed to measure flame time (After flame), glow time (After glow), and length of carbonized portion (melted portion in the case of synthetic fibers) (cm.).

It is preferable that the "After flame" time and the "After glow" time be as short as possible and that the length of carbonization or melted portion be less than 12 cm. in length.

EXAMPLE 1

1 mole of a compound having the formula:

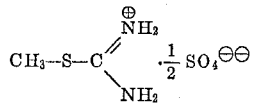

was added to 15% aqueous solution of 2.2 moles of formaldehyde and the mixture was stirred for 24 hours and was diluted to prepare an aqueous solution having 15% solid components.

The following textile test pieces were, respectively, dipped in said aqueous solution and were mangled at the rate of 80% pick up. They were dried at 70° C. and heated at 130° C. to provide permanent flame resistant textiles. The results of the flameproofing tests on those textiles treated by said process are show in Table 1.

TABLE 1

| Type of textile | Treated | | | After 10 times washing | | |
|---|---|---|---|---|---|---|
| | F, sec. | G, sec. | C, cm. | F, sec. | G, sec. | C, cm. |
| Cotton | 0 | 0 | 4.8 | 0 | 0 | 5.9 |
| Polyester:cotton | 0 | 0 | 6.8 | 0 | 0 | 8.0 |
| Nylon | 0 | 0 | 7.5 | 0 | 0 | 8.6 |
| Polyester | 0 | 0 | 7.2 | 0 | 0 | 8.2 |

NOTE: In the table, the following abbreviations are used: Polyester=poly-ethyleneterephthalate; F=after flame; G=after glow; C=length of carbonized portion.

EXAMPLE 2

In an aqueous solution containing 10% of a compound having the formula:

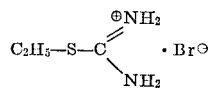

and 7% of trimethylolmelamine, the following test pieces of textiles were, respectively, dipped and mangled at the rate of 80% pick up. They were dried and heated for 3 minutes at 140° C. to provide permanent flame resistant textiles. The results of flameproofing tests of textiles treated are shown in Table 2.

TABLE 2

| Type of textile | Treated | | | After 10 times washing | | |
|---|---|---|---|---|---|---|
| | F, sec. | G, sec. | C, cm. | F, sec. | G, sec. | C, cm. |
| Cotton | 0 | 0 | 4.0 | 0 | 0 | 4.9 |
| Polyester:cotton | 0 | 0 | 6.0 | 0 | 0 | 7.3 |
| Nylon | 0 | 0 | 7.5 | 0 | 0 | 8.8 |
| Polyester | 0 | 0 | 7.1 | 0 | 0 | 8.0 |

The treatment was applied to propylene textile, except that the treated textile was heated at 110° C. for 5 minutes. Moreover, the same treatment was used for polyacrylonitrile textiles, except that the treated textile was steamed for 5 minutes with super-saturated steam. The following results of flameproofing tests were found:

TABLE 3

| Type of textile | Treated | | | After 10 times washing | | |
|---|---|---|---|---|---|---|
| | F, sec. | G, sec. | C, cm. | F, sec. | G, sec. | C, cm. |
| Polyacrylonitrile | 0 | 0 | 5.6 | 0 | 0 | 7.1 |
| Polypropylene | 0 | 0 | 8.0 | 0 | 0 | 9.3 |

EXAMPLE 3

Methoxymethyl-thiourea was reacted with excess methyliodide in dimethylformamide at room temperature for 24 hours to obtain a product containing the flameproofing agent having the formula:

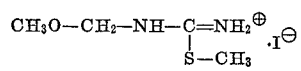

as the main product.

In 20% aqueous solution of said product, the following test pieces of textiles were, respectively, dipped and mangled at the rate of 80% pick up. They were dried and heated at 120° C. for 5 minutes to provide permanent flame resistant textiles.

The results of the flameproofing tests are shown in Table 4:

TABLE 4

| Type of textile | Treated | | | After 10 times washing | | |
|---|---|---|---|---|---|---|
| | F, sec. | G, sec. | C, cm. | F, sec. | G, sec. | C, cm. |
| Cotton | 0 | 0 | 5.4 | 0 | 0 | 6.8 |
| Polyester:cotton | 0 | 0 | 6:1 | 0 | 0 | 7.2 |
| Nylon | 0 | 0 | 6.8 | 0 | 0 | 7.7 |
| Polyester fiber | 0 | 0 | 7.5 | 0 | 0 | 8.4 |

EXAMPLE 4

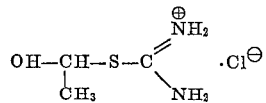

(a)

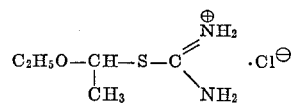

(b)

or

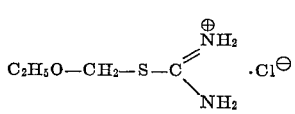

(c)

The following test pieces of textiles were, respectively, dipped and mangled into a 10% aqueous solution of each compound, at the rate of 100% pick up. They were dried and heated at 140° C. for 3 minutes to provide permanent flame resistant textiles.

The compound (a) was produced by reacting α-chloroethyl alcohol with thiourea, and the compound (b) was produced by reacting α-chloroethyl alcohol with thiourea or by introducing hydrochloride gas into the dispersion of acetoaldehyde and thiourea in ethanol, and the compound (c) was produced by reacting ethylchloromethyl-ether with thiourea.

The results of the flameproofing tests on compound (a) are shown in Table 5.

TABLE 5

| Type of textile | Treated | | | After 10 times washing | | |
|---|---|---|---|---|---|---|
| | F, sec. | G, sec. | C, cm. | F, sec. | G, sec. | C, cm. |
| Cotton | 0 | 0 | 4.2 | 0 | 0 | 5.6 |
| Polyester:cotton | 0 | 0 | 7.0 | 0 | 0 | 8.2 |
| Nylon | 0 | 0 | 7.3 | 0 | 0 | 8.1 |
| Polyester | 0 | 0 | 7.9 | 0 | 0 | 8.8 |

EXAMPLE 5

1 mole of $C_4H_9O-CH_2-NHCS-NH_2$ was reacted with excess of methyliodide in butanol at 60°–70° C. for 1 hour. Then butanol was distilled in vacuum and the product was washed with benzene to obtain a flameproofing agent containing:

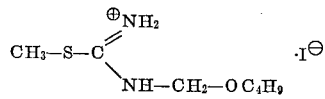

as main product.

The same process was repeated, except using $$C_4H_9O-CH_2-NHCSNH-CH_2-OC_4H_9$$

A flameproofing agent containing:

$$CH_3-S-C\overset{\overset{\oplus}{N}H-CH_2-OC_4H_9}{\underset{NH-CH_2-OC_4H_9}{\diagup}} \cdot I^{\ominus}$$

as a main product was obtained.

The same type of reaction can be carried out using N-methylolthiourea, N,N-dimethylolthiourea or derivative thereof.

Into a 20% aqueous solution of each of said two flameproofing agents, the following test pieces of textiles were, respectively, dipped and mangled at the rate of 80% pick up. They were dried and heated at 130° C. for 5 minutes to provide permanent flame resistant textiles.

The results of flameproofing tests are shown in Table 6:

TABLE 6

| Type of textile | Treated | | | After 10 times washing | | |
|---|---|---|---|---|---|---|
| | F, sec. | G, sec. | C, cm. | F, sec. | G, sec. | C, cm. |
| Cotton | 0 | 0 | 4.3 | 0 | 0 | 5.2 |
| Polyester:cotton | 0 | 0 | 6.0 | 0 | 0 | 6.9 |
| Nylon | 0 | 0 | 7.5 | 0 | 0 | 8.8 |
| Polyester | 0 | 0 | 7.0 | 0 | 6 | 7.9 |

EXAMPLE 6

Into a 15% aqueous solution of methylol pseudothiourea, $$CH_3O-CH_2-S\overset{NH}{\underset{NH_2}{\diagup}}$$

hydrobromide aqueous solution cooled with ice was added dropwise while stirring so that no gel was formed.

The same reaction was carried out using:

$$CH_3O-CH_2-S-C\overset{N-CH_2-OCH_3}{\underset{NH_2}{\diagup}}$$

Into said solution, the following test pieces of textiles were, respectively, dipped and mangled at the rate of 80% pick up. They were steamed with super saturated steam for 5 minutes and washed, and dried to provide permanent flame resistant textiles.

EXAMPLE 7

Into an aqueous solution containing 20% of each of the following flameproofing agents and 7% dimethylolthiourea, and 1% accelerator (Sumitex accelerator ACH), the following test pieces of textiles were, respectively, dipped and mangled at the rate of 80% pick up. They were dried at 80° C. for 5 minutes and then heated at 140° C. for 3 minutes to provide permanent flame resistant textiles.

$$\left[CH_2-S-C\overset{\oplus NH_2}{\underset{NH_2}{\diagup}}\right]_2 \cdot 2I^{\ominus} \quad (a)$$

$$CH_3-S-C\overset{\oplus NH_2}{\underset{NH-CH_2-NH-C=\oplus NH_2}{\diagup}} \cdot 2I^{\ominus} \quad (b)$$
$$\phantom{CH_3-S-C\overset{\oplus NH_2}{\underset{NH-CH_2-NH-}{\diagup}}}\underset{S-CH_3}{|}$$

The compound (a) was produced by reacting thiourea with methylene diiodide.

The compound (b) was produced by reacting methylene dithiourea with methyl iodide in methanol.

The results of flameproofing tests of textiles treated with compound (b) are shown in Table 7:

TABLE 7

| Type of textile | Treated | | | After 10 times washing | | |
|---|---|---|---|---|---|---|
| | F, sec. | G, sec. | C, cm. | F, sec. | G, sec. | C, cm. |
| Cotton | 0 | 0 | 4.5 | 0 | 0 | 5.2 |
| Polyester:cotton | 0 | 0 | 6.7 | 0 | 0 | 7.8 |
| Nylon | 0 | 0 | 7.9 | 0 | 0 | 9.0 |
| Polyester | 0 | 0 | 7.3 | 0 | 0 | 8.0 |

The same treatment was used for polypropylene textiles, except that heat was applied at 110° C. for 5 minutes. Moreover, the same treatment was applied to polyacrylonitrile textiles, except that supersaturated steam was applied for 5 minutes.

The following results of the flameproofing tests are found:

TABLE 8

| Type of textile | Treated | | | After 10 times washing | | |
|---|---|---|---|---|---|---|
| | F, sec. | G, sec. | C, cm. | F, sec. | G, sec. | C, cm. |
| Polyacrylonitrile | 0 | 0 | 5.1 | 0 | 0 | 6.7 |
| Polypropylene | 0 | 0 | 7.8 | 0 | 0 | 9.2 |

EXAMPLE 8

The following textile test pieces were, respectively, treated with dimethylolpseudothiourea having the general formula:

$$HOCH_2-S-C\overset{\overset{\oplus}{N}HCH_2OH}{\underset{NH_2}{\diagup}} \cdot Br^{\ominus}$$

The resultant test pieces were, respectively, dipped in a 5% aqueous solution of hydrobromic acid for 5 hours and were mangled at the rate of 80% pickup. They were dried at 80° C. and washed with water, and then were steamed for 5 minutes with super saturated steam to provide excellent permanent flame resistant textiles as shown in Table 9. It is considered that the hydrobromic acid is bonded to the resin made of dimethylolpseudothiourea on the fiber, in the form of thiuronium salt.

TABLE 9

| Type of textile | Treated | | | After 10 times washing | | |
|---|---|---|---|---|---|---|
| | F, sec. | G, sec. | C, cm. | F, sec. | G, sec. | C, cm |
| Cotton | 0 | 0 | 5.0 | 0 | 0 | 5.8 |
| Polyester:cotton | 0 | 0 | 6.9 | 0 | 0 | 7.7 |
| Nylon | 0 | 0 | 6.9 | 0 | 0 | 7.9 |
| Polyester | 0 | 0 | 7.8 | 0 | 0 | 8.6 |

EXAMPLE 9

1 mol of ethylenedibromide and 2 mols of ethylenethiourea were refluxed in ethanol for 10 hours to provide the following compound:

$$\underset{CH_2-NH}{\overset{CH_2-NH^{\oplus}}{|}}C-S-CH_2\cdot CH_2-S-C\underset{NH-CH_2}{\overset{\oplus NH-CH_2}{|}} \cdot 2Br^{\ominus}$$

40% formalin solution containing 1 mol of said bis-thiuronium salt and 4 mol. of formaldehyde was stirred at room temperature, and then was heated at 50°–60° C. and stirred for 5 hours. The resultant methylol compound was diluted with water to prepare the treating bath having 15% solid component.

The following textile test pieces were, respectively, dipped and mangled at the rate of 100% pick up. They were dried and heated at 130° C. for 5 minutes to provide permanent flame resistant textiles. When polyacrylonitrile fiber was tested, the dried test piece was steamed with super saturated steam for 5 minutes. On the other hand, when polypropylene fiber was tested, the dried test pieces was heated at 100° C. for 5 minutes.

The results of flameproofing tests are shown in Table 10:

TABLE 10

| Type of textiles | Treated | | | After 10 times washing | | | After 3 times drycleaning | | |
|---|---|---|---|---|---|---|---|---|---|
| | F, sec. | G, sec. | C, cm. | F, sec. | G, sec. | C, cm. | F, sec. | G, sec. | C, cm. |
| Cotton | 0 | 0 | 4.0 | 0 | 0 | 5.2 | 0 | 0 | 5.0 |
| Rayon | 0 | 0 | 4.3 | 0 | 0 | 5.5 | 0 | 0 | 4.9 |
| Acetate | 0 | 0 | 4.5 | 0 | 0 | 5.8 | 0 | 0 | 5.2 |
| Wool | 0 | 0 | 2.0 | 0 | 0 | 3.0 | 0 | 0 | 2.5 |
| Polyvinyl | 0 | 0 | 3.0 | 0 | 0 | 3.7 | 0 | 0 | 3.5 |
| Nylon | 0 | 0 | 5.0 | 0 | 0 | 5.8 | 0 | 0 | 5.5 |
| Polyester | 0 | 0 | 4.5 | 0 | 0 | 5.5 | 0 | 0 | 4.8 |
| Polyacryl | 0 | 0 | 6.0 | 0 | 0 | 7.0 | 0 | 0 | 6.3 |
| Polyester:cotton | 0 | 0 | 4.8 | 0 | 0 | 5.3 | 0 | 0 | 5.1 |
| Nylon:rayon | 0 | 0 | 5.3 | 0 | 0 | 6.0 | 0 | 0 | 5.5 |
| Polyacryl:wool | 0 | 0 | 4.8 | 0 | 0 | 5.6 | 0 | 0 | 5.3 |
| Polypropylene | 0 | 0 | 5.5 | 0 | 0 | 6.0 | 0 | 0 | 5.9 |

EXAMPLE 10

1 mol of ethylenedibromdie and 2 mol of thiourea were refluxed in ethanol for 10 hours to provide the following compound:

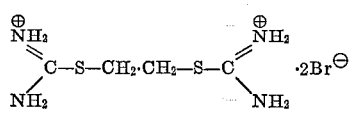

40% formalin solution containing 1 mol of said bis-thiouronium salt and 6 mol of formaldehyde was stirred at room temperature, and then was heated at 50°-60° C. for 5 hours. The resulting compounds were diluted with water to prepare the treating bath having 15% solid component.

The following test pieces of textiles were, respectively, dipped and mangled at the rate of 100% pick up. They were, respectively, heat treated by the same method shown in the Example 9.

The results of flameproofing tests are shown in Table 11:

TABLE 11

| Type of textiles | Treated | | | After 10 times washing | | | After 3 times drycleaning | | |
|---|---|---|---|---|---|---|---|---|---|
| | F, sec. | G, sec. | C, cm. | F, sec. | G, sec. | C, cm. | F, sec. | G, sec. | C, cm. |
| Cotton | 0 | 0 | 4.2 | 0 | 0 | 5.0 | 0 | 0 | 4.7 |
| Wool | 0 | 0 | 2.5 | 0 | 0 | 3.7 | 0 | 0 | 3.0 |
| Nylon | 0 | 0 | 4.8 | 0 | 0 | 5.6 | 0 | 0 | 5.1 |
| Polyester | 0 | 0 | 4.5 | 0 | 0 | 5.3 | 0 | 0 | 5.2 |
| Polyacryl | 0 | 0 | 6.3 | 0 | 0 | 7.0 | 0 | 0 | 6.8 |
| Polypropylene | 0 | 0 | 5.8 | 0 | 0 | 6.2 | 0 | 0 | 6.0 |
| Polyester:cotton | 0 | 0 | 5.0 | 0 | 0 | 5.8 | 0 | 0 | 5.3 |

EXAMPLE 11

1 mol of ethylenedibromide and 2 mol of guanyl-thiourea were refluxed in ethanol for 10 hours to provide the folowing compound:

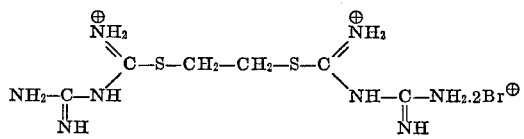

40% formalin solution containing 1 mol of said bis-thiouronium salt and 6 mol of formaldehyde was stirred at room temperature, and then was heated at 50°-60° C. for 5 hours, under stirring. The resultant compounds were diluted after adding 0.2 mol of guandiyl phosphate to prepare the treating bath having 20% solid component.

The following test pieces of textiles were, respectively, dipped and mangled at the rate of 100% pick up. They were, respectively, heat treated by the same method shown in the Example 9. The results of flameproofing tests are shown in Table 12:

TABLE 12

| Type of textiles | Treated | | | After 10 times washing | | | After 3 times drycleaning | | |
|---|---|---|---|---|---|---|---|---|---|
| | F, sec. | G, sec. | C, cm. | F, sec. | G, sec. | C, cm. | F, sec. | G, sec. | C, cm. |
| Cotton | 0 | 0 | 3.8 | 0 | 0 | 5.0 | 0 | 0 | 4.5 |
| Rayon | 0 | 0 | 4.0 | 0 | 0 | 4.8 | 0 | 0 | 4.5 |
| Acetate | 0 | 0 | 4.1 | 0 | 0 | 5.2 | 0 | 0 | 5.0 |
| Wool | 0 | 0 | 2.0 | 0 | 0 | 2.8 | 0 | 0 | 2.6 |
| Polyvinyl | 0 | 0 | 2.8 | 0 | 0 | 3.2 | 0 | 0 | 3.1 |
| Nylon | 0 | 0 | 4.8 | 0 | 0 | 5.7 | 0 | 0 | 5.2 |
| Polyester | 0 | 0 | 4.3 | 0 | 0 | 5.3 | 0 | 0 | 5.0 |
| Polyacryl | 0 | 0 | 6.0 | 0 | 0 | 6.8 | 0 | 0 | 6.5 |
| Polyester:cotton | 0 | 0 | 4.5 | 0 | 0 | 5.2 | 0 | 0 | 4.9 |
| Nylon:rayon | 0 | 0 | 5.0 | 0 | 0 | 5.9 | 0 | 0 | 5.2 |
| Polyacryl:wool | 0 | 0 | 4.8 | 0 | 0 | 5.0 | 0 | 0 | 5.0 |
| Polypropylene | 0 | 0 | 5.3 | 0 | 0 | 5.9 | 0 | 0 | 5.5 |

EXAMPLE 12

1 mol of benzylchloride and 1 mol of N,N'-dimethyl-thiourea were refluxed in ethanol for 10 hours to provide the following compound:

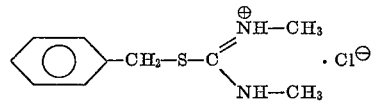

40% Formalin solution containing 1 mol of said thiouronium salt and 1 mol of formaldehyde was stirred at room temperature and then was heated at 50°-60° C. for 2 hours while stirring. The resulting compounds were diluted to prepare a treating bath of 15% solid component.

The following test pieces of textiles were, respectively, dipped and mangled at the rate of 100% pick up. They were, respectively, heat treated by the same method shown in the Example 9. The results of flameproofing tests are shown in Table 13:

TABLE 13

| Type of textiles | Treated | | | After 10 times washing | | | After 13 times drycleaning | | |
|---|---|---|---|---|---|---|---|---|---|
| | F, sec. | G, sec. | C, cm. | F, sec. | G, sec. | C, cm. | F, sec. | G, sec. | C, cm. |
| Cotton | 0 | 0 | 6.0 | 0 | 0 | 6.8 | 0 | 0 | 6.5 |
| Nylon | 0 | 0 | 6.8 | 0 | 0 | 7.9 | 0 | 0 | 7.3 |
| Polyester | 0 | 0 | 6.3 | 0 | 0 | 7.8 | 0 | 0 | 7.0 |
| Polyacryl | 0 | 0 | 7.0 | 0 | 0 | 8.2 | 0 | 0 | 7.9 |
| Polypropylene | 0 | 0 | 7.5 | 0 | 0 | 8.5 | 0 | 0 | 8.0 |

EXAMPLE 13

The following textile test pieces were, respectively, dipped in each of 8% aqueous solution of:

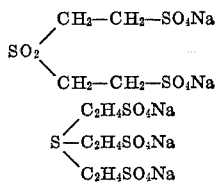  (a)

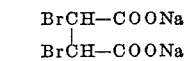  (b)

or

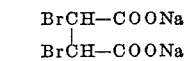  (c)

Each test piece was mangled at the rate of 80% pick up and dried at 60°–70° C.

Each sample piece was dipped in 20% aqueous solution of:

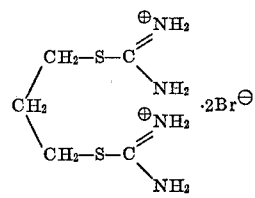

Each piece was mangled at the rate of 80% pick up and was dried and heated at 130° C. Each piece treated was washed and dried to provide permanent flame resistant textile.

The results of the flameproofing tests are shown in Table 14:

TABLE 14

| Type of textile | Treated compound | Treated | | After 10 times washing | |
|---|---|---|---|---|---|
| | | F, sec. | C, cm. | F, sec. | C, cm. |
| Cotton | (a) | 0 | 5.0 | 0 | 6.1 |
| Rayon | (a) | 0 | 5.1 | 0 | 6.1 |
| Polyester:cotton | (a) | 0 | 6.5 | 0 | 7.9 |
| Nylon | (a) | 0 | 7.1 | 0 | 9.6 |
| Cotton | (b) | 0 | 5.2 | 0 | 6.1 |
| Rayon | (b) | 0 | 5.4 | 0 | 6.0 |
| Polyester:cotton | (b) | 0 | 6.4 | 0 | 8.0 |
| Nylon | (b) | 0 | 7.2 | 0 | 10.1 |
| Cotton | (c) | 0 | 4.4 | 0 | 5.7 |
| Rayon | (c) | 0 | 4.4 | 0 | 5.5 |
| Polyester:cotton | (c) | 0 | 6.2 | 0 | 10.0 |

EXAMPLE 14

Into a 15% aqueous solution of:

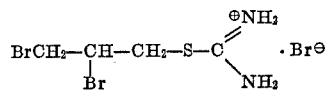

The following test pieces of textiles were, respectively, dipped and mangled at the rate of 80% pick up. They were dried and heated at 130° C. for 5 minutes to provide a permanent flame resistant textile.

The same treatment was repeated using:

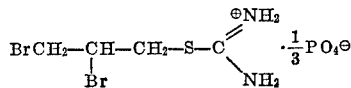

This compound was produced by brominating allylthiuronium salt or by partially reacting propyl-tribromide with thiourea. The results of the flameproofing tests of textiles treated by the former compound are shown in Table 15:

TABLE 15

| Type of fiber | Treated | |
|---|---|---|
| | F, sec. | C, cm. |
| Cotton | 0 | 5.1 |
| Rayon | 0 | 5.4 |
| Polyester:cotton | 0 | 7.8 |

EXAMPLE 15

Each textile treated in Example 9 was dipped in an aqueous solution containing 7% of each following compound and mangled at the rate of 80% pick up. Each piece was dried and heated at 130° C. for 5 minutes and further was washed and dried to provide permanent flame resistant textiles.

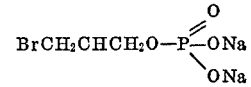  (a)

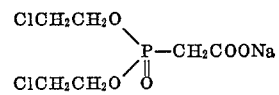  (b)

Ammonium salt of polyvinylalcohol phosphate (c)
Zinc borate (d)

The results of flameproofing tests are shown in Table 16:

TABLE 16

| Type of fiber | Agent | Treated | | After 10 times washing | |
|---|---|---|---|---|---|
| | | F, sec. | C, cm. | F, sec. | C, cm. |
| Cotton | (a) | 0 | 4.8 | 0 | 5.2 |
| Rayon | (a) | 0 | 4.9 | 0 | 5.4 |
| Polyester:cotton | (a) | 0 | 6.9 | 0 | 8.0 |
| Polyester | (a) | 0 | 10.1 | 0.8 | 11.3 |
| Cotton | (b) | 0 | 5.0 | 0 | 5.1 |
| Rayon | (b) | 0 | 5.0 | 0 | 5.3 |
| Polyester:cotton | (b) | 0 | 7.2 | 0 | 8.1 |
| Polyester | (b) | 0 | 10.5 | 0.7 | 11.6 |
| Cotton | (c) | 0 | 5.1 | 0.1 | 7.2 |
| Rayon | (c) | 0 | 5.2 | 0.1 | 7.5 |
| Polyester:cotton | (c) | 0 | 7.1 | 0.3 | 9.7 |
| Cotton | (d) | 0 | 4.9 | 0 | 5.3 |
| Rayon | (d) | 0 | 4.8 | 0 | 5.4 |
| Polyester:cotton | (d) | 0 | 7.6 | 0 | 8.8 |

EXAMPLE 17

Into an aqueous solution of 15% of the following thiuronium compound, 15% tetrahydroxymethyl phosphonium chloride and 3% triethanolamine, the following test pieces of textiles were dipped and mangled at the rate of 75% pick up. They were dried at 85° C. for 4.5 minutes and heated at 140° C. for 4.5 minutes to provide permanent flame resistant textiles.

The thiuronium compound was produced by reacting 1 mole of tris-(propyl dibromo)phosphate with 3 moles of thiourea. The resulting flameproofing tests are shown in Table 17:

TABLE 17

| Type of fiber | Treated | | | After 10 times washing | | |
|---|---|---|---|---|---|---|
| | F, sec. | G, sec. | C, cm. | F, sec. | G, sec. | C, cm. |
| Cotton | 0 | 0 | 5.1 | 0 | 0 | 6.0 |
| Polester:cotton | 0 | 0 | 6.2 | 0 | 0 | 7.2 |
| Nylon | 0 | 0 | 6.8 | 0 | 0 | 7.6 |
| Polyester | 0 | 0 | 7.2 | 0 | 0 | 8.0 |

EXAMPLE 18

Into each aqueous solution of 15% of:

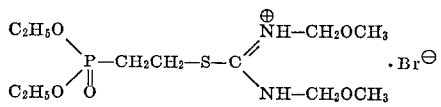

and 5% of each of the following compounds, the following test pieces of textiles were, respectively, dipped and mangled at the rate of 80% pick up. They were dried and heated at 130° C. and then were washed and dried to provide permanent flame resistant textiles.

(a) trimethylolmelamine
(b) dimethylolthiourea
(c) tetramethylol phosphonium chloride The results of flameproofing tests are shown in Table 18:

TABLE 18

| Type of fiber | Agent | Treated | | After 10 times washing | |
|---|---|---|---|---|---|
| | | F, sec. | C, cm. | F, sec. | C, cm. |
| Cotton | (a) | 0 | 5.6 | 0 | 6.3 |
| Rayon | (a) | 0 | 5.8 | 0 | 6.5 |
| Polyester:cotton | (a) | 0 | 8.0 | 0 | 9.2 |
| Cotton | (b) | 0 | 5.4 | 0 | 5.9 |
| Rayon | (b) | 0 | 5.5 | 0 | 5.8 |
| Polyester:cotton | (b) | 0 | 7.9 | 0 | 9.1 |
| Nylon | (b) | 0 | 8.1 | 0 | 10.4 |
| Cotton | (c) | 0 | 4.5 | 0 | 5.3 |
| Rayon | (c) | 0 | 4.4 | 0 | 5.0 |
| Polyester:cotton | (c) | 0 | 6.7 | 0 | 8.8 |
| Polyester | (c) | 0 | 8.5 | 0 | 11.0 |

EXAMPLE 19

Into each aqueous solution of 20% of each following compound, the following test pieces of textiles were, respectively, dipped and mangled at the rate of 80% pick up. They were dried and heated at 130° C. for 5 minutes and then were washed and dried to provide permanent flame resistant textiles.

(a)

$$CH_3-S-C\begin{smallmatrix}\oplus NH_2\\ \\NH-CH_2-CONH-CH=CH_2\end{smallmatrix} \cdot I^{\ominus}$$

(b)

$$HOCH_2-NHCOCH_2-S-C\begin{smallmatrix}\oplus NH_2\\ \\NH_2\end{smallmatrix} \cdot Cl^{\ominus}$$

(c)

[structure (c): triazine ring with three $-S-C(\oplus NH_2)(NH_2)$ groups attached via $-CH_2CH_2-O-$ linkages, $\cdot 2Br^{\ominus}Cl^{\ominus}$]

The compound (a) was produced by reacting $$CH_2=CH-CONH-CH_2-NHCSNH_2$$

which was made of acrylamide, thiourea and formaldehyde, with excess methyl iodide in dimethylformamide at room temperature for one day.

The compound (b) was produced by reacting N-methylol-chloroacetoamide with thiourea.

The compound (c) was produced by condensing 1 mole of cyanurylchloride and 2 moles of ethylene bromohydrine and then reacting 3 moles of thiourea.

The results of flameproofing tests are shown in Table 19:

TABLE 19

| Type of fiber | Agent | Treated | | After 10 times washing | |
|---|---|---|---|---|---|
| | | F, sec. | C, cm. | F, sec. | C, cm. |
| Cotton | (a) | 0 | 5.0 | 0 | 6.7 |
| Rayon | (a) | 0 | 5.1 | 0 | 6.9 |
| Polyester:cotton | (a) | 0 | 7.7 | 0 | 10.4 |
| Polyester | (a) | 0 | 8.6 | 0 | 13.0 |
| Cotton | (b) | 0 | 6.3 | 0 | 9.6 |
| Rayon | (b) | 0 | 6.2 | 0 | 10.0 |
| Polyester:cotton | (b) | 0 | 10.5 | 0 | 13.3 |
| Cotton | (c) | 0 | 6.0 | 0 | 9.1 |
| Rayon | (c) | 0 | 6.0 | 0 | 9.3 |
| Polyester:cotton | (c) | 0 | 10.1 | 0 | 12.9 |

EXAMPLE 20

Into each aqueous solution of 20% of each of the following compounds, the following textile test pieces were, respectively, dipped and mangled at the rate of 100% pick up. They were dried and heated at 140° C. for 3 minutes and then were washed and dried to provide permanent flame resistant textiles.

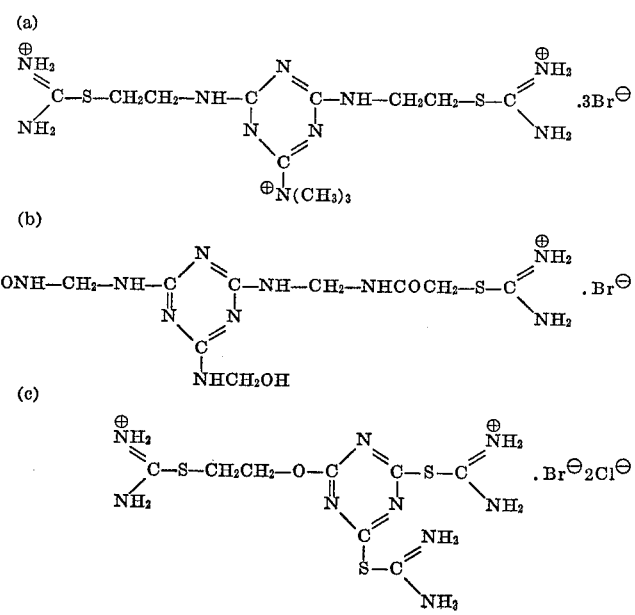

(d)
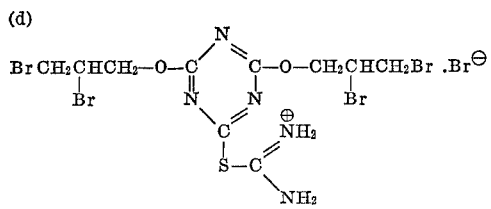

The results of the flameproofing tests are shown in Table 20:

TABLE 20

| Type of fiber | Agent | Treated | | After 10 times washing | |
|---|---|---|---|---|---|
| | | F, sec. | C, cm. | F, sec. | C, cm. |
| Cotton | (a) | 0 | 6.1 | 0.1 | 8.9 |
| Rayon | (a) | 0 | 6.0 | 0.1 | 9.1 |
| Polyester:cotton | (a) | 0 | 9.8 | 0.2 | 13.0 |
| Cotton | (b) | 0 | 5.3 | 0 | 8.0 |
| Rayon | (b) | 0 | 5.3 | 0 | 8.0 |
| Polyester:cotton | (b) | 0 | 6.4 | 0 | 9.0 |
| Polyester | (b) | 0 | 8.7 | 0 | 12.4 |
| Cotton | (c) | 0 | 6.5 | 0.3 | 10.6 |
| Rayon | (c) | 0 | 6.4 | 0.3 | 10.8 |
| Polyester:cotton | (c) | 0 | 7.1 | 0.5 | 14.1 |
| Cotton | (d) | 0 | 5.9 | 0.1 | 9.0 |
| Rayon | (d) | 0 | 5.8 | 0.2 | 9.7 |
| Polyester:cotton | (d) | 0 | 8.0 | 0.4 | 14.0 |

EXAMPLE 21

1 mole of 2,4,6-tris-bromoethyoxy-1,3,5-triazine was dissolved in dimethylformamide, in which dimethylformamide solution of 3 mole of thiourea was added dropwise to react at 90°–100° C. for 5 hours. The following compound was obtained:

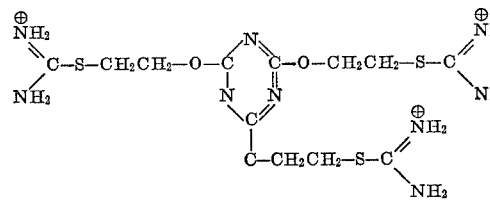

1 mole of said compound and paraformaldehyde (6 mole as HCHO) were added to dimethylformamide and stirred at 50°–60° C. for 2 hours and diluted with dimethylformamide to provide a solution of 20% solid components. Then, 10% dimethylol-pseudo-thiourea was added to said solution. In the solution, the test pieces of textiles were, respectively, dipped and mangled at the rate of 80% pick up, and were dried and heated at 130° C. for 5 minutes to provide permanent flame resistant textiles.

The results of flameproofing tests are shown in Table 21:

TABLE 21

| Type of Fiber | Treated | | | After 10 times washing | | |
|---|---|---|---|---|---|---|
| | F, sec. | G, sec. | C, cm. | F, sec. | G, sec. | C, cm. |
| Cotton | 0 | 0 | 5.5 | 0 | 0 | 6.3 |
| Polyester:cotton | 0 | 0 | 6.3 | 0 | 0 | 7.5 |
| Nylon | 0 | 0 | 7.0 | 0 | 0 | 8.0 |
| Polyester | 0 | 0 | 7.1 | 0 | 0 | 8.0 |

EXAMPLE 22

1 mole of cyanuryl chloride was reacted with 2 moles of allylalcohol in dioxane in the presence of an alkali catalyst, so that 2,4-bis-allyloxy-6-chloro-1,3,5-triazine resulted. The triazine was then brominated to yield:

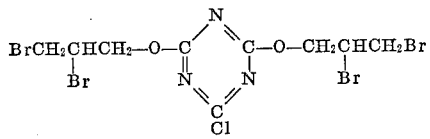

1 mole of said compound was reacted wtih 3 moles of thiourea to provide an excellent "reaction type" flameproofing agent. Into an aqueous solution of 15% of said compound, the textile test pieces were, respectively, dipped and mangled at the rate of 70% pick up, and were dried and heated at 140° C. for 3 minutes to provide permanent flame resistant textile. The results of the flameproofing tests are shown in Table 22:

TABLE 22

| Type of Fiber | Treated | | | After 10 times washing | | |
|---|---|---|---|---|---|---|
| | F, sec. | G, sec. | C, cm. | F, sec. | G, sec. | C, cm. |
| Cotton | 0 | 0 | 5.2 | 0 | 0 | 6.1 |
| Polyester:cotton | 0 | 0 | 6.5 | 0 | 0 | 7.8 |
| Nylon | 0 | 0 | 7.5 | 0 | 0 | 8.5 |
| Polyester | 0 | 0 | 7.0 | 0 | 0 | 8.3 |

EXAMPLE 23

1 mole of bromoethoxy-trichloro-pyrimidine was reacted with 3 moles of thiourea to yield:

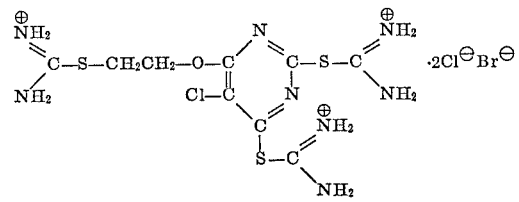

which is a permanent flameproofing agent.

EXAMPLE 24

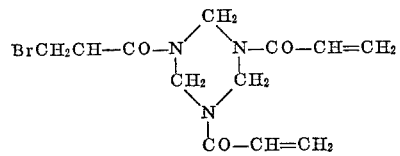

(hexahydro-triazine derivative) was reacted with thiourea to yield:

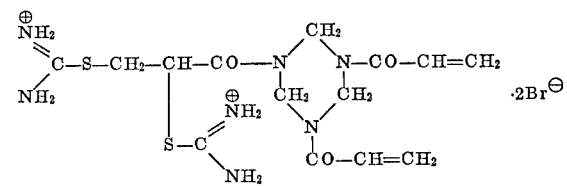

which is an excellent permanent flameproofing agent.

EXAMPLE 25

Into an aqueous solution of 1 mole of tetrahydroxymethyl phosphonium chloride shown as

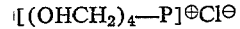

an aqueous solution of 4 mole of thiourea was added and stirred at 50° C. for 10 hours. Into this solution, an aqueous solution of ethyl bromide (5 mole) was added and stirred at room temperature for 24 hours. Into the aqueous solution containing a solid component of said product, the textile test pieces were respectively dipped and mangled at the rate of 80% pick up, and then were dried and steamed with super saturated steam for 10 minutes to provide permanent flame resistant textiles. The results of flameproofing tests are shown in Table 23:

TABLE 23

| Type of Fiber | Treated | | | After 10 times washing | | |
|---|---|---|---|---|---|---|
| | F, sec. | G, sec. | C, cm. | F, sec. | G, sec. | C, cm. |
| Cotton | 0 | 0 | 5.8 | 0 | 0 | 6.7 |
| Polyester:cotton | 0 | 0 | 6.2 | 0 | 0 | 7.1 |
| Nylon | 0 | 0 | 6.9 | 0 | 0 | 7.8 |
| Polyester | 0 | 0 | 7.0 | 0 | 0 | 7.8 |

EXAMPLE 26

Into an aqueous formaldehyde solution having a pH of 8–9 sodium carbonate was added. 1 mole of melamine per 3 moles of formaldehyde was added while stirring to effect a solution at about 60° C. and then was heated at 80°–90° C. to react them, to result transparent syrup of melamine resin. In said syrup, ethyl-pseudo thiourea-hydrobromate (15% of solid components) was added, and then rayon pulp was mixed and kneaded to impregnate said solution. After kneading the mixture was dried with air at 60°–80° C. and crushed into a powder and then a hardener was added.

The melamine resin powder was molded at 135°–150° C. under pressure of 105–150 kg./cm.$^2$. The molding product showed excellent flame resistance in comparison with similar molding products without ethyl-pseudo thiourea hydrobromate.

EXAMPLE 27

1 ground mole of polyvinylalcohol and 1 mole of thiourea were reacted in the presence of 12 moles of 80% $H_3PO_3$ at 125° C. for 13 hours to yield a polymer in which about 27% of the hydroxy groups of said polyvinylalcohol are substituted with thiuronium salt.

Into an aqueous solution containing 7% of the thiuronium salt of polyvinylalcohol, the following textile test pieces were, respectively, dipped and mangled at the rate of 80% pick up. They were then dried and heated at 130° C. for 5 minutes and were washed with water and dried to provide permanent flame resistant textiles as shown in Table 24:

TABLE 24

| Type of Fiber | Treated | | | After 10 times washing | | |
|---|---|---|---|---|---|---|
| | F, sec. | G, sec. | C, cm. | F, sec. | G, sec. | C, cm. |
| Nylon | 0 | 0 | 10.0 | 0 | 0 | 11.0 |
| Cotton | 0 | 0 | 6.7 | 0 | 0 | 7.1 |
| Polyester:cotton | 0 | 0 | 8.2 | 0 | 0 | 8.8 |
| Polyvinyl type | 0 | 0 | 7.1 | 0 | 0 | 8.2 |

Having now fully described the invention, it will be apparent to one of ordinary skill in the art that many changes and modifications can be made thereto without departing from the spirit or scope of the invention.

What is claimed as new and desired to be secured by Letters Patent of the United States is:

1. A process for flameproofing fibers, films, sheets, boards or other articles which comprises dipping, coating, spraying or blending said material with a compound having the general formula:

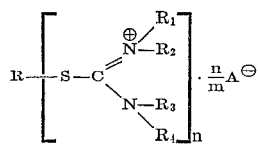

wherein R represents a saturated or unsaturated alkyl radical, an aralkyl radical, an aryl radical, or a heterocyclic radical selected from the group consisting of pyridinyl, pyrimidinyl, triazinyl, thiazolyl, imidazolyl, oxazolyl, isoxyazolyl, pyrazolyl, quinonyl, and acrydyl, which radical may be substituted by a halogen atom, hydroxy, alkoxy, phenyl, epoxy, acyl, acylamine, acyloxy, amino, imino, carbonyl, carboxyl, carboxylic ester or phosphor, or R is a polymeric hydrocarbon group which may be substituted by hydroxy, cyano, carboxyl, carboxylic ester, carbamoyl radical or halogen atom; and $R_1$, $R_2$, $R_3$, and $R_4$ each respectively, represent a hydrogen atom, or R, or a component of the heterocyclic group formed from two components selected from $R_1$, $R_2$, $R_3$, and $R_4$, said heterocyclic group being selected from the group consisting of pyridinyl, pyrimidinyl, triazinyl, thiazolyl, imidazolyl, oxazolyl, isoxyazolyl, pyrazolyl, quinonyl, and acrydyl, which group may be substituted by halogen atom, hydroxy, alkoxy, phenyl, epoxy, acyl, acylamine, acyloxy, amino, imino, carbonyl, carboxyl, carboxylic ester, and A represents an inorganic or an organic anion, and $n$ represents an integer of 1 to 4, and $m$ represents the valency of A.

2. The process of claim 1, wherein said material to be flameproofed is dipped in a solution of said compound, mangled, dried and heated to fix said compound on said material.

3. The process of claim 1, wherein said material treated with said flameproofing compound is a textile fiber selected from the group consisting of cotton, polyester, nylon, polyacrylonitrile, polypropylene, acetate, vinyl polymer, wool, and polyacryl.

References Cited

UNITED STATES PATENTS

| 2,607,803 | 8/1952 | Lecher et al. | 260—564 |
| 2,910,505 | 10/1959 | Winthrop | 260—564 |
| 3,535,300 | 10/1970 | Gable | 260—29.1 |

CHARLES E. VAN HORN, Primary Examiner

U.S. Cl. X.R.

252—8.1; 8—115.5; 106—15 FP; 260—552 R, Digest 24